Patented Nov. 20, 1934

1,981,675

UNITED STATES PATENT OFFICE 1,981,675

METHOD OF PRODUCING SOLID CARBON DIOXIDE

Philipp Stapp, Munich, Germany

No Drawing. Application September 7, 1929, Serial No. 391,113. In Germany September 12, 1928

3 Claims. (Cl. 62—121)

The present invention relates to a method of producing solid carbon dioxide directly from liquid carbon dioxide by freezing the liquid to a solid body. This is obtained by the pressure in a receptacle with liquid carbon dioxide being released so slowly that the formation of snow is avoided, that is to say so that no particles of solid carbon dioxide can form or only to a very inconsiderable extent in the form of snow in the carbon dioxide, the pressure of which is released. Hitherto the method always adopted was to quickly release the pressure of the liquid carbon dioxide, which flows through a nozzle, for the purpose of intentionally causing formation of snow, in which case a portion of the expanded carbon dioxide was converted directly into solid carbon dioxide, i. e. into snow. This process is uneconomical and involves difficulties insofar as the resulting snow has first of all to be converted into solid blocks by pressing. In such a case losses naturally occur and there is also the risk that parts of the carbon dioxide snow will be carried along into the return pipe for the non-solidified residual carbon dioxide, so that the pipes become clogged and in addition explosions may be caused in the pipes.

A method is also known for obtaining carbon dioxide snow by introducing liquid carbon dioxide while maintaining its tension into a closed receptacle, and thereupon withdrawing the carbon dioxide gas, set free, from the receptacle, while reducing the pressure, in order thus to convert a portion of the liquid carbon dioxide into carbon dioxide snow. Solid ice in a compact form cannot be produced by this known method; on the contrary it is only possible to obtain solid carbon dioxide in a loose form.

Finally another method is known in which carbon dioxide ice is obtained in a compact form from liquid carbon dioxide. In the known method the liquid carbon dioxide flows into a vessel under such a pressure that it remains in liquid form. A portion of the liquid carbon dioxide escapes through a branch pipe into a coil, which surrounds the vessel. Owing to the expanding carbon dioxide in the coil, such a super-cooling takes place in the latter that as a result owing to withdrawal of heat by heat exchange the liquid carbon dioxide contained in the inner vessel freezes to solid ice. This known method therefore, in other words, is carried out in such a way that by gases of low temperature by means of heat exchange through the walls of the receptacle the liquid carbon dioxide is caused to freeze.

The present invention differs fundamentally from these known processes by the fact that the internal pressure of the liquid carbon dioxide is released so slowly that the formation of carbon dioxide snow is avoided. In such a case the pressure and temperature drop gradually to the limit of the triple point, whereupon as the process proceeds further the liquid congeals to ice. The invention is advisably carried out in such a way that after a suitable precooling the liquefied carbon dioxide by slow expansion is cooled down as close as possible to the temperature at which solid crystals of carbon dioxide are already forming in the liquid. If the carbon dioxide liquid which is intermingled with crystals is then left to stand in the limit state, that is to say the slow expansion continues, the conversion of the liquid into solid ice then takes place while the pressure becomes constant, without external cooling, simply by internal expansion. The processes can take place in one receptacle or separately in a plurality one after the other.

What I claim is:

1. The method of producing solid carbon dioxide ice direct from liquid carbon dioxide, consisting in so very gradually releasing the pressure within a closed receptacle containing liquid carbon dioxide as to cause the carbon dioxide to assume a dense, solid form.

2. The method of producing solid carbon dioxide ice direct from liquid carbon dioxide, consisting in so very gradually releasing the pressure within a closed receptacle containing liquid carbon dioxide under conditions near those of the triple point as to cause the carbon dioxide to assume a dense, solid form.

3. The method of producing solid carbon dioxide ice direct from liquid carbon dioxide, consisting in pre-cooling liquid carbon dioxide, transferring the pre-cooled liquid carbon dioxide to a closed receptacle, and so very gradually releasing the pressure within said closed receptacle as to cause the carbon dioxide to assume a dense, solid form.

PHILIPP STAPP.